United States Patent [19]

Piras

[11] 4,200,226
[45] Apr. 29, 1980

[54] PARALLEL MULTIPROCESSING SYSTEM FOR AN INDUSTRIAL PLANT

[75] Inventor: Giancarlo Piras, Milan, Italy
[73] Assignee: Euteco S.p.A., Milan, Italy
[21] Appl. No.: 923,864
[22] Filed: Jul. 12, 1978
[51] Int. Cl.² ............................................. G06F 11/00
[52] U.S. Cl. ......................................... 371/9; 364/119
[58] Field of Search ....................... 364/119, 200, 900; 235/303.3

[56] References Cited

U.S. PATENT DOCUMENTS

| | | | |
|---|---|---|---|
| 3,593,307 | 7/1971 | Gouge, Jr. et al. | 364/900 |
| 3,636,331 | 1/1972 | Amrehn | 364/119 X |
| 3,665,173 | 5/1972 | Bouricius et al. | 235/303.3 |
| 3,681,578 | 8/1972 | Stevens | 235/303.3 |
| 3,786,433 | 1/1974 | Notley et al. | 364/200 |

*Primary Examiner*—David H. Malzahn
*Attorney, Agent, or Firm*—Sughrue, Rothwell, Mion, Zinn and Macpeak

[57] ABSTRACT

A system for monitoring and control of an industrial installation, such as a chemical plant, having a large number of operating parameters which have to be maintained between well defined limits which may be fixed or may vary in time in a predetermined manner, comprising a plurality of sensors, one for each parameter being monitored, four digital computers arranged in matrix configuration, two of them having peripheral memories as well as central memories, and means for converting the essentially analogue signals from the sensors into encoded, serialized digital signals for the computers each of which has an associated watch dog detector which senses if it should go faulty and in such event instructs the other three computers or one of the other three computers to take over its functions.

3 Claims, 2 Drawing Figures

PARALLEL MULTIPROCESSING SYSTEM FOR AN INDUSTRIAL PLANT

BACKGROUND OF THE INVENTION

The present invention relates to an automation system for an industrial plant, especially a chemical plant the operating parameters of which are subject to supervision and correction by digital electronic calculators with memorized program, as a function of signals proportional to the values of the said operating parameters.

For continuous correct operation of a industrial plant it would be necessary for the operating parameters to remain constant in time at a predetermined value, whereas in the case of non-continuous (batch processing) plants it would be necessary for the operating parameters to be varied in time in accordance with a strict predetermined logic sequence.

It is in fact obvious that any excessive variation in the value of one of the parameters would upset the smooth operation of the system, whereas such variations are unavoidable in practice. Consequently it is important to continually, if not continuously, maintain surveillance on the operating conditions of an industrial plant so as to be able to intervene promptly if the conditions in the plant tend to deviate undesirably from predetermined values, which values may be determined by calculations on the basis of memorized criteria.

In this connection there is at present a tendency to assign the task of supervision and control of industrial plants to checking apparatus including at least one electronic digital computer, this partially or wholly replacing the usual instruments.

The adoption of electronic computers for these purposes has been slowed-down however, because of problems of reliability of such systems. When using conventional instrument supervision and control means, all signals representing the operating parameters of the plant are transmitted to a central control room and processed in parallel, which allows supervision with a very high overall reliability. When digital computers are employed for such purposes the parameters cannot be processed in parallel because, as is known, digital computers are essentially sequential in operation and can only detect in series the signals coming from the plant, and can only intervene serially upon the control members of the said plant.

The use of computers therefore involves the loss of the "parallelism" which is a feature of conventional instrumentation and control techniques with consequent loss of reliability in the system.

OBJECTS OF THE INVENTION

One object of the invention is to ensure continuity of operation of a control system in the event of malfunctioning, or failure of one or more control computers.

Another object of the present invention is to improve reliability of computer controlled systems to a degree such that large scale use of computers in the supervision and control of industrial plants can be undertaken.

A further object of the present invention is to provide a highly reliable system for the automation of an industrial plant, more particularly a chemical plant.

SUMMARY OF THE INVENTION

The present invention is particularly distinguished in that it provides a system for the automation of an industrial plant, such as a chemical plant the operating parameters of which are subject, at least partly, to monitoring and adjustment by digital electronic computers in dependence on signals representing the values of the aforesaid parameters, wherein said system comprises:

a plurality of sensors for detecting the parameters of said plant to be monitored, four digital electronic computers each with a central memory, in which there are stored identical programs for processing the parameters of said plant which are to be monitored, said computers being paid out according to a matrix circuit;

connection means operatively and selectively interconnecting said computers to each other and to said sensors on the plant to be checked, one of said computers including:

means for reading in sequence all the incoming signals representing detected values of said parameters arriving from said sensors on said plant based on said memorized program, means for transmitting to the other computers signals representing said readings, means for comparing said signals read with corresponding stored or calculated nominal or limit values based on said memorized program, signalling and checking means connected to said other computers, means for activating said signalling and checking means in the event of a discrepancy between said detected values and said corresponding stored or calculated nominal or limit values, based on said memorized program; and the three said other computers including, means for receiving from said one computer signals representing which of said of said readings are being taken, means for receiving from said one computer signals representing said readings, and means for comparing said signals from said one computer with corresponding memorized or calculated nominal, or limit, values based on their memorized programs;

four operational watch-dog detectors, each having one input and three outputs, means connecting the input of each watch-dog detector to a respective computer, means connecting the three outputs of each watch-dog detector to the three computers other than the one to which its input is connected, means on each computer for feeding its associated watch-dog detector with check signals at predetermined time intervals; said watch-dog detectors operating to generate a failure signal which is fed to the other three computers is said check signal fails to arrive at the predetermined time, means on said computers for selecting, from said other three computers, upon receipt of a failure signal from the watch-dog detector of said one computer, which of said computers is to take over from said one computer.

According to the present invention, the signals arriving from individual sensors which detect the value of the parameters of the plant being monitored are processed individually according to their type, and converted into serialized digital signals.

The normal routine of the said one digital computer consists of interrogating in sequence all the sensors in a continuous cyclic series, based upon the program memorized in it and upon informing the remaining three computers as to the interrogation carried out. In this way the remaining three computers are able correctly to link their programs with the signals arriving in parallel to the four computers.

The said one computer moreover provides for energizing signalling and checking means in the event of a discrepancy between the values read and those memorized or calculated, by means of its outputs, which are connected to the plant; these outputs are also connected to one or more control desks having video monitors, key boards, optical and/or acoustic warning devices etc.

According to a preferred embodiment of this invention the four computers each have a central memory storing identical programs for processing signals representing the primary parameters of the plant, two of said computers also being provided with a peripheral memory for storing programs for processing secondary parameters of said plant and also for preparing programs, the matrix arrangement of said computers being such that the computers having peripheral memories are one of:

both in the same row, and
both in the same column, said one computer being, in normal operating conditions, one having a peripheral memory as well as a central memory.

With this arrangement the said one computer is preferably, in normal operating conditions, one of those having a peripheral memory as well as a central memory.

Further features and advantages of the invention will become apparent during the course of the following description which is provided purely by way of non-restrictive example, and in which reference is made to the accompanying drawings.

DESCRIPTION OF THE PREFERRED EMBODIMENT

Figure 1:
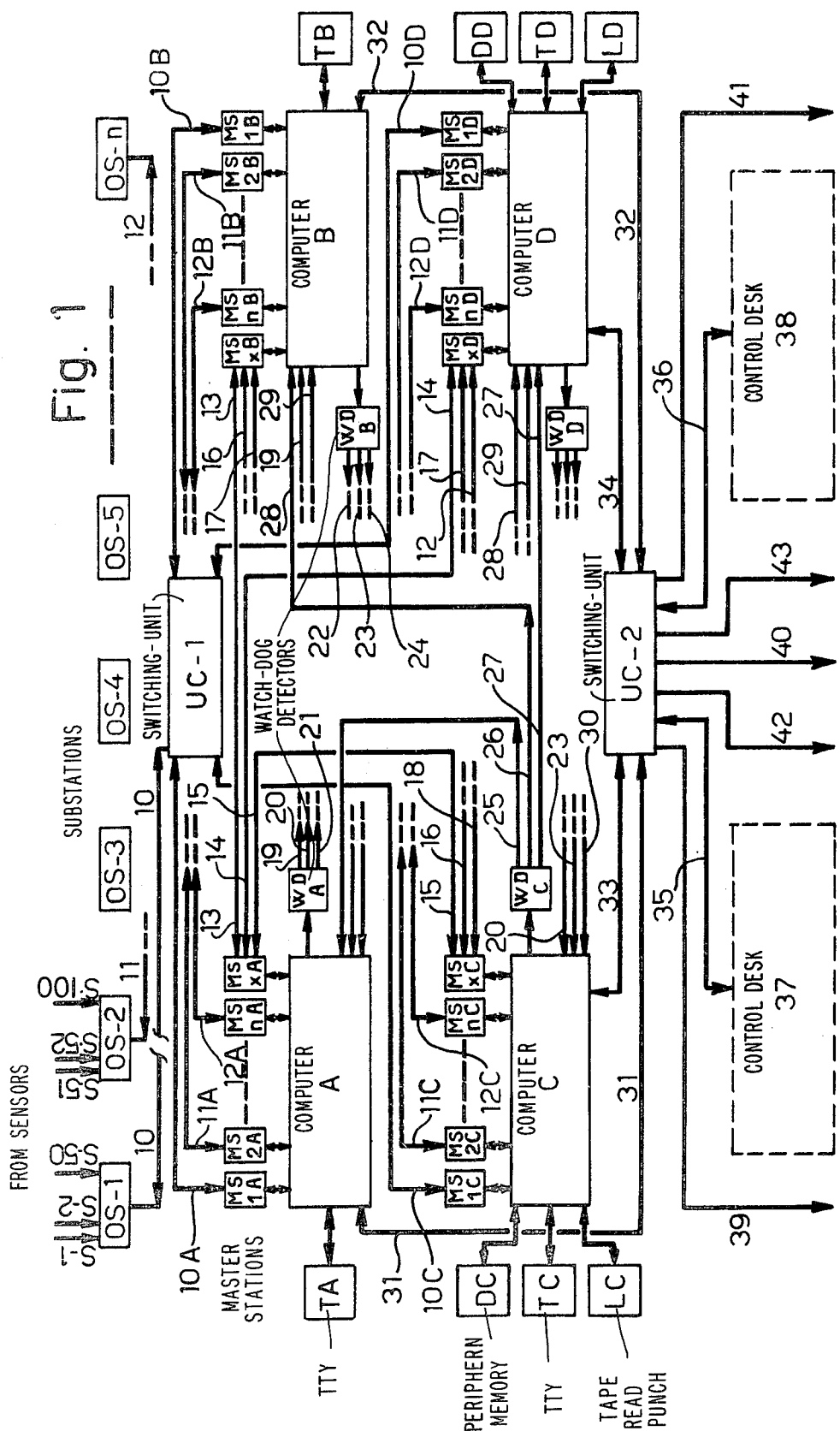
FIG. 1 is a diagram illustrating the lay out of the four computers in accordance with the principles of the present invention.

In FIG. 1 there are shown four digital electronic computers A, B, C, D each housing a central memory, with magnetic or semi-conductor cores, in which there are memorized the programs for processing the basic parameters of a chemical plant to be supervised and controlled by the supervision and control system of which the computers A, B, C, D form part.

The computers C and D are additionally provided with an identical peripheral memory DC and DD respectively, which may be a magnetic disc or drum memory, intended for memorising the programs for processing the secondary parameters of the plant, and possibly for program planning.

Each of the four computers has an associated teletype service machine (TA, TB, TC, TD), and the computers C and D are also provided with a reader unit and tape puncher (LC and LD).

A plurality of substations OS-1, OS-2, ... OS-n are positioned close to the sensors (not shown) which detect the operating parameters of the plant to be checked, the substations receive signals arriving from the plant, and pass them on to the computers having first converted them into digital form (the sensors themselves would usually generate analogue signals), in a manner which will be described in greater detail below. The overall number of parameters will be different for each plant, but each substation is capable of handling signals representing fifty parameters. Thus, the substation OS-1 handles signals which for convenience may be labelled 1–50, whilst substation OS-2 handles signals 51 to 100 and so on. Since the number of parameters to be checked will be different for different plants, the number of substations will also be different: for example, for a chemical plant the number of substations may be between twenty and fifty.

The digital signals from the substations are also serialized and coded, and they pass first to a unit for shunting and switching, and from this unit pass in parallel to the four computers after passing through a master station to be decoded. The unit for shunting (for the input signals) and for switching (for the output signals from the digital computer) is shown as UC-1 in FIG. 1 and will hereinafter be called the switching unit UC-1 for brevity.

Each substation of the plant is connected to four master stations, each connected to a computer. Thus, as indicated in FIG. 1, the four master stations to which the substations OS-1 are connected comprise the master station MS-1A connected to the computer A, MS-1B connected to the computer B, MS-1C connected to the computer C and MS-1D connected to the computer D.

Similarly, the substation OS-2 is connected to four master stations MS-2A, MS-2B, MS-2C and MS-2D; more generally, a substation OS-n is connected to four master stations MS-nA, NS-nB, MS-nC and MS-nD, which latter are connected to the computers A, B, C, D respectively. Thus, a signal originating from the substation OS-1 arrives along a line 10 at the switching unit UC-1, and from this is passed to the computer A via a line 10A and the master station MS-1A, to the computer B via line 10B and the master station MS-1B, to the computer C, via a line 10C and the master station MS-1C, and to the computer D via a line 10D and the master station MS-1D.

Likewise, signals coming from the substations OS-2 and OS-n arrive at the switching unit UC-1 via lines 11, 12, and from there are fed in parallel to the four computers via lines 11A, 11B, 11 C and 11D and, 12A, 12B, 12C and 12D respectively. Signals from stations between OS-2 and OS-n are treated similarly, each of the lines being a telephone loop circuit.

The computers themselves are interconnected by synchronization lines which are connected to the respective computers by synchronization master stations which are shown in FIG. 1 as MS-XA (for computer A), MS-XB (for computer B), MS-XC (for computer C) and MS-XD (for computer D).

The synchronizing lines are indicated 13, 14, 15, 16, 17 and 18 and connect the computers A and B, A and C, A and D, B and C, B and D and C and D respectively. Over these lines each digital computer supplies the other computers with a check reading.

In addition, for surveillance purposes, there are also provided four "watch-dog" detectors, one to each computer, indicated WD-A, WD-B, WD-C and WD-D in an obvious notation, each "watch-dog" detector operating to detect any irregularity in the operation of the computer to which it is connected. Thus, the "watch-dog" detector WD-A is connected to the computer A to detect its operation, and is connected via the circuit lines 19, 20 and 21, to the computers B, C and D respectively. Likewise, the "watch-dog" detector WD-B is operatively connected to the computer B, and is connected via the lines 22, 23 and 24 to the other computers A, C and D respectively; in the same way "watch-dog" detector WD-C is operatively connected to the computer C, and linked via lines 25, 26 and 27 to the computers A, B and D respectively, and "watch-dog" detector WD-D is operatively connected to the computer D and linked via the lines 28, 29 and 30 to the other three computers A, B and C respectively.

The outputs of the four computers A, B, C, D are connected to a switching unit UC-2 which is connected to two control desks 37 and 38 by lines 35 and 36; three lines 39, 40 and 41 connect the switching unit UC-2 to the service teletypes, and one or more video display devices for displaying the values of the parameters are also connected thereto by lines 42, 43 and serve as repeaters for the warning signals when such are generated.

These video display devices for the most part replace conventional recorders and alarms, such as regulators, indicators, synoptics, interblocks, sequence logic, controls, and others.

Conveniently, the control desks include one or more video display devices by means of which it is possible to see visually the lay-out of the plant, with the current positions of the control members and the instantaneous values of the measurements; one or more push-button panels in which the buttons correspond to particular areas of the plant; a warning signal in one area causes intermittent illumination (flashing) of the corresponding button, and when this button is depressed, the values of the parameters corresponding to this area are displayed on the video display device; in addition there are one or more alphanumerical keyboards which can be operated for activating further controls or request and for expansion or modifying of the display on the video, and an indicator panel showing the state of the computers and of their peripherals: finally there are printer units for providing printouts of information for written documentation of events, bulletins or the like, relating to the running of the plant.

Figure 2:
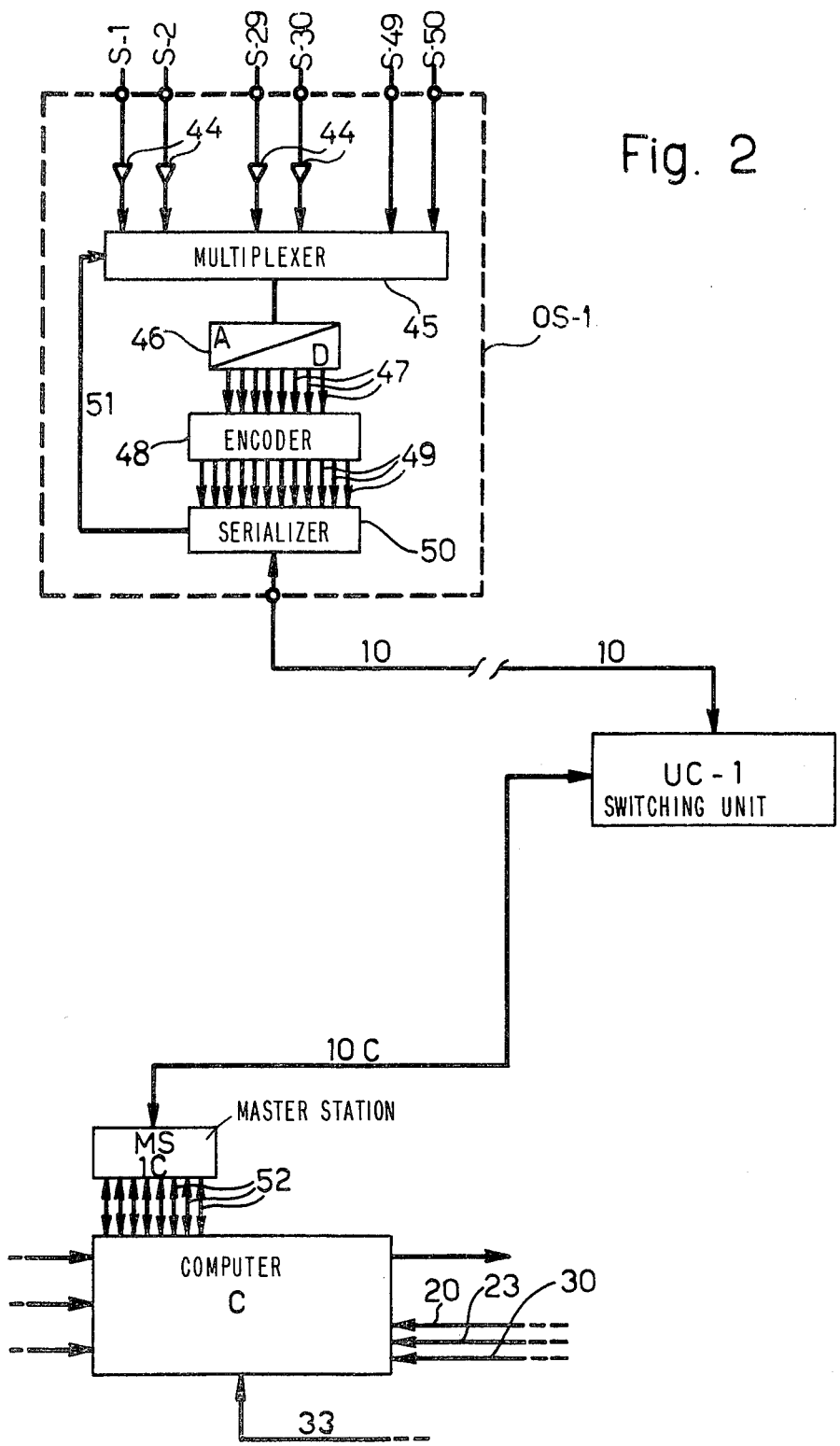
FIG. 2 is a diagram illustrating an example of the manner in which the signals arriving from the plant are processed and transmitted to the appropriate digital computer.

In the FIG. 2 there is shown a case in which analogue signals, partly at low and partly at high level, arrive at the substation OS-1 and from this digital signals are fed to the digital computer C, as well as to the other computers, via the switching unit UC-1. The sensors associated with substation OS-1 are shown as S-1, S-2, . . . S-50, and each of these supplies an analogue (current) signal, proportional to the value of the operating parameter to which that sensor is sensitive.

The substation OS-1 comprises a multiplexer 45 which, in the embodiment illustrated, has fifty inputs, thirty of them being connected to the sensors S-1 . . . S-30, via respective amplifiers 44 which raise the level of the signal from the sensors from a value in the millivolt region to a value of the order of Volts. The remaining twenty inputs to the multiplexer 45 are connected to further sensors, similar to the others, but which feed to the multiplexer analogue current signals, which indicate other parameters, which are already of the order of volts and which therefore do not need to be amplified.

The substation OS-1 also includes an analogue-to-digital converter 46 which feeds output digital signals to an encoder 48. From the encoder 48 signals are fed on lines 49 to a receiver/transmitter unit 50 which has a feedback connection 51 to the multiplexer 45.

The receiver-transmitter unit 50 receives orders through the loop circuit 10 from the associated digital computer C. The normal routine of the computer C consists, inter alia, of interrogating, according to the program, the 50 inputs of the multiplexer 45 in order to receive their respective signals (and, of course, of doing the same for the other inputs of each of the other substations shown in FIG. 1). Thanks to the memorized program, the computer C "knows" which sensor it is about to interrogate at any given time and to which part of the plant it belongs. For example, when the sensor 30 is to be interrogated, then the computer C sends the interrogation signal, through the master station MS-1C to the address of that input of the multiplexer 45 of the substation OS-1 to which the sensor S-30 is connected.

In compliance with the inquiry of the computer C, the multiplexer 45 sends the analogue signal of the sensor S-30 to the analogue-to-digital convertor 46 where it is converted into a corresponding digital signal composed, for example, of eight bits. The output of the A/D convertor 46 consists of the 8 lines 47 (one per bit) which lead to the encoder 48 which completes the "message", adding to the eight "information" bits a "beginning-of-message" bit, two "end-of-message" bits and a parity bit. The output of the encoder 48 therefore consists of twelve circuit lines 49 which lead into the receiver/transmitter unit 50 for serialization.

The receiver/transmitter station 50 serializes the individual bits, sending them one after the other to the switching unit UC-1 via the loop circuit 10. From the switching unit, however, they are fed in parallel to the master stations MS-1A, MS-1B, MS-1C and MS-1D connected to the respective computers. In the embodiment shown in FIG. 2 the master station MS-1C confirms the authenticity of the message (in the possible presence of noise), and then eliminates the four bits added by the encoder 48, and passes the eight information bits to the computer C, in parallel on the eight output lines 52.

Wholly similar operations take place in the corresponding master stations connected to the other computers. If the value of the check reading arriving at the computer C from the other computers, on the synchronization lines 13, 14, 15, 16, 17, and 18 does not correspond to the value (or interval of values) memorized in the said computer (or calculated based upon its program) then an error signal is generated, based upon which the master station sends a correcting signal via the corresponding substation. This correcting signal could be sent directly from the computer. At the same time the computer C sends a warning signal over the line 33.

FIG. 2 illustrates an embodiment in which analogue signals are sent from the sensors, but in which other signals can arrive at the substations, such as, for example, digital signals, impulse trains, and so on. Obviously such signals will be processed according to their nature, and will, if necessary, be converted into digital form, coded and serialized.

In the embodiment illustrated the configuration of the four computers is a matrix with duality according to the lines and the possibility of degradation according to the columns. In this case, by considering the initial operation being undertaken by a computer having a peripheral memory, there is a total reserve and two partial or degraded reserves.

As can be seen from the drawings, the inputs to the system from the substations and from the control desk arrive in parallel at all the computers which will therefore at any moment be brought up to date with the situation of the plant and the operators' requests.

Moreover the operating computer informs the other calculators via the synchronization lines, about the interrogations carried out, so that the latter can accurately link the data they receive. The output of the system to the plant and to the control desks, on the other hand, is effected solely by the operating computer. This is achieved by means of the switching units which connect the peripherals to the outputs of the operating computer.

One of the operations of the operating computer consists of sending a renewal signal to the relative watch-dog detector at predetermined intervals. In the event of this signal not reaching it, due to malfunctioning of the operating computer, the watch-dog detector sends a priority signal to the other computers. In this event a program for selecting a new operating computer is put into effect on each of the remaining computers. This program takes account of which computer was the operating computer, of which computers remain available, and, based on memorized criteria, induces switching of the output circuit lines on the computer which involves the minimum operational degradation of the system. This program also takes into account possible incompatabilities between switching actions erroneously effected by the computers.

What is claimed is:

1. A system for the automation of an industrial plant, such as a chemical plant the operating parameters of which are subject, at least partly, to monitoring and adjustment by digital electronic computers in dependence on signals representing the values of the aforesaid parameters, wherein said system comprises:
    (a) a plurality of sensors for detecting the parameters of said plant to be monitored;
    (b) four digital electronic computers each with a central memory, in which there are stored identical programs for processing the parameters of said plant which are to be monitored, said computers being laid out according to a matrix circuit;
    (c) plant malfunction signaling means;
    (d) connection means operatively and selectively interconnecting said computers to each other and to said sensors on the plant to be checked, one of said computers including;
        means for reading in sequence all the incoming signals representing detected values of said parameters arriving from said sensors on said plant, based on said memorized program,
        means for sending to the other computers signals identifying said readings,
        means for comparing the detected values with corresponding stored values, based on said memorized program,
        means for activating said plant malfunction signaling means in the event of a discrepancy between said detected values and said corresponding stored values, based on said memorized program; and each of the remaining three said computers including,
        means connected for receiving from said one computer the signals identifying the readings being taken,
        means connected for receiving from said sensors signals corresponding to the identification signals received from said one computer, and
        means connected for comparing the signals received from the sensors with corresponding memorized values based on their memorized programs;
    the system further comprising:
    (e) four operational watch-dog detectors, each having one input and three outputs;
    (f) means connecting the input of each watch-dog detector to a respective computer;
    (g) means connecting the three outputs of each watch-dog detector to the three computers other than the one to which its input is connected;
    (h) means in each computer for feeding its associated watch-dog detector with check signals at predetermined time intervals, the watch-dog detector associated with said one computer operating to generate a failure signal which is fed to the other three computers if said check signal fails to arrive at the predetermined time, and
    (i) program-controlled means in said computers for selecting, from said remaining three computers, upon receipt of a failure signal from the watch-dog detector of said one computer, which of said computers is to take over from said one computer.

2. A system as in claim 1, wherein said four computers each have a central memory storing identical programs for processing signals representing the primary parameters of the plant, two of said computers also being provided with a peripheral memory for storing programs for processing secondary parameters of said plant and also for preparing programs.

3. A system as in claim 1 or claim 2, wherein the connection means (d) comprise a substation located adjacent said sensors for converting analogue signals from said sensors into digital signals, encoding said digital signals and serializing the encoded digital signals for transmission to said computers.

* * * * *